United States Patent [19]

Iwane

[11] 4,431,199
[45] Feb. 14, 1984

[54] SELF-HYDRAULIC PRESSURE GENERATING AND MAINTAINING DEVICE FOR SHAFT-SEAL MECHANISM

[76] Inventor: Tomoichiro Iwane, No. 52, Okazaki-Tenno-Cho, Sakyo-ku, Kyoto, Kyoto Prefecture, Japan

[21] Appl. No.: 447,001

[22] Filed: Dec. 2, 1982

[30] Foreign Application Priority Data

Dec. 7, 1981 [JP] Japan ................. 56-197422

[51] Int. Cl.³ .................. F16J 15/40; F16J 15/54
[52] U.S. Cl. ........................... 277/3; 277/15; 277/29; 277/75
[58] Field of Search .............. 277/3, 15, 28, 29, 70, 277/73–77, 173, 203

[56] References Cited

U.S. PATENT DOCUMENTS

| | | | |
|---|---|---|---|
| 1,130,615 | 3/1915 | Lawsen | 277/203 X |
| 2,774,619 | 12/1956 | Mercier | 277/70 X |
| 3,161,413 | 12/1964 | Audemar | 277/3 |
| 3,937,022 | 2/1976 | Swearingen | 277/15 X |
| 3,972,396 | 8/1976 | Bochnak | 277/15 X |

FOREIGN PATENT DOCUMENTS 1061274 7/1959 Fed. Rep. of Germany ........ 277/73

*Primary Examiner*—Robert S. Ward
*Attorney, Agent, or Firm*—Mason, Fenwick & Lawrence

[57] ABSTRACT

A pressurizing device for a pump seal includes a cylindrical chamber fitted over an extension of a pump shaft external of the seal with a sliding piston inside the chamber being mounted for reciprocation relative to the external shaft portion in dividing the space in the cylinder into high pressure and low pressure chambers with the high pressure chamber communicating with the seal. A screw pump consisting of a pumping thread on the shaft is positioned in a bore axially extending through the piston with rotation of the shaft effecting pumping through a check valve to the high pressure chamber from the low pressure chamber so as to cause the piston to move toward the low pressure chamber and compress a compression spring mounted in the low pressure chamber. The compression spring urges the piston toward the high pressure chamber so as to always maintain high pressure in the high pressure chamber after the pump operation and consequent rotation of the shaft is terminated. Pressure relief valve means vents the high pressure chamber to the low pressure chamber when pressures reach a predetermined value in the high pressure chamber.

12 Claims, 2 Drawing Figures

SELF-HYDRAULIC PRESSURE GENERATING AND MAINTAINING DEVICE FOR SHAFT-SEAL MECHANISM

DETAILED EXPLANATION OF THE INVENTION

This invention relates to a self-hydraulic pressure generating and maintaining device for a shaft-seal mechanism.

It is generally known that many different kinds of pressure generating and maintaining devices for shaft-seal mechanisms have been previously used. Examples include mechanical seals, oil pressure type systems, flushing systems pressurized with tap water, and inert gas cylinder systems and the like. Many prior systems for preventing leakage of impure fluid to the shaft seal parts operate by effecting circulation of the pressure fluid from an external source by using a pump or the like or by using the self-discharge pressure of the pump or similar device being sealed; however, such systems and devices are entirely dependent either on external energy or pressure fed from the outside when the pump or similar apparatus is out of operation.

It is difficult to completely prevent leakage of fluid and protect the revolving contact parts solely by the use of a mechanical seal; moreover, mechanical seals render the device complicated, big, and expensive.

The present invention was developed in view of obviating the above-mentioned disadvantages, and it is the object of the present invention to provide a new and improved self-hydraulic pressure generating and maintaining device for shaft-seal mechanisms which is convenient to assemble and capable of providing a highly effective shaft seal as well as being easy to manufacture by making the construction as simple as possible.

In order to achieve its purpose, the device of the present invention is so designed to enhance the shaft seal function and prolong the life of the shaft seal portion by applying pressure to fluid by using the revolving force of the revolving shaft being sealed during operation of the apparatus. Further, the present invention is designed to maintain the pressure and accomplish the sealing of the shaft portion by reliance on spring means and other means that store energy for use when the equipment is out of operation.

Additional advantages of the present invention arise from the fact that it is very compactly constructed and can be incorporated easily between the casing of a pump body and the bearing box or even in the bearing box. Moreover, the present invention can be produced at a low cost.

These and other objects of the present invention are achieved by the preferred embodiments in a manner which will become apparent when the following detailed explanation is considered in conjunction with the accompanying drawings in which:

DETAILED DESCRIPTION OF THE EMBODIMENT

Figure 1:
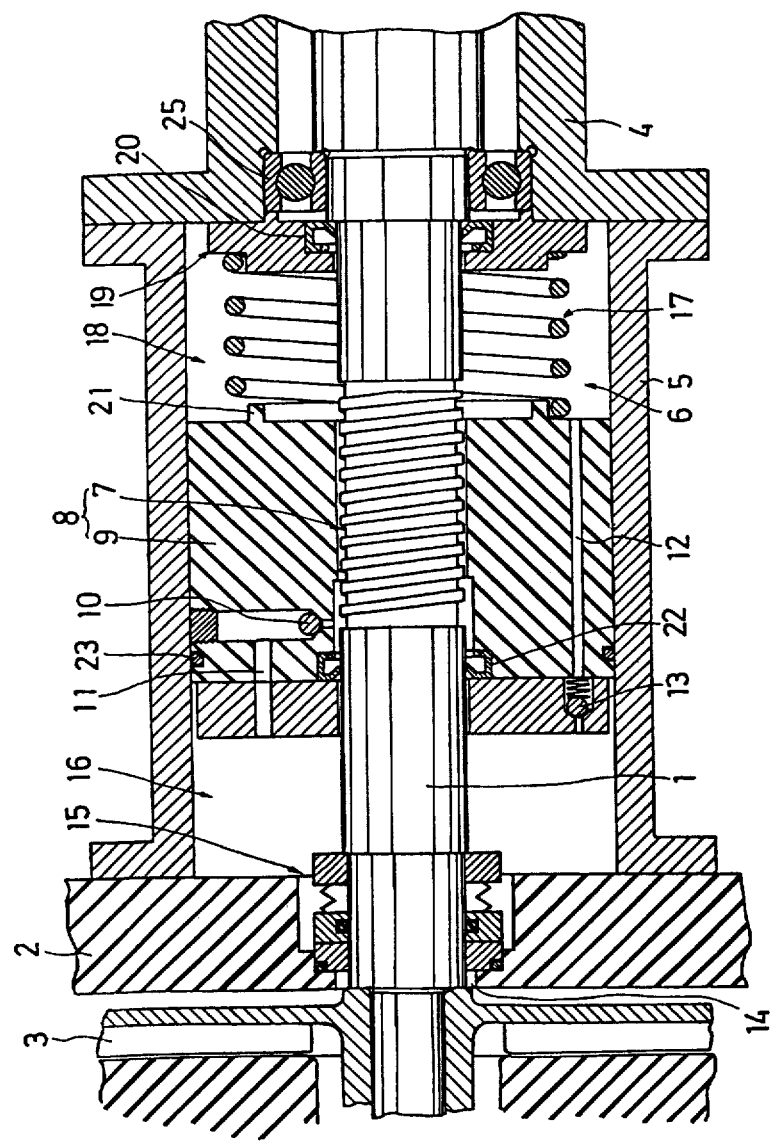
FIG. 1 is a sectional view showing a first embodiment of the present invention.

As shown in FIG. 1, a pump impeller 3 housed in a pump casing 2 is mounted at the fore-end of a revolving shaft 1, and an external cylindrical shell 5 is mounted between the pump casing 2 and a bearing box 4 to enclose a fluid containing part 6, and a fluid pressure device 8. Fluid pressure device 8 includes a screw pump 7 arranged nearly at the middle portion of said revolving shaft 1 in cylindrical shell 5 between the pump casing 2 and the bearing box 4. The outer circumferential surface of a piston 9 is positioned for axial movement relative to shaft 1 and in free sliding contact with the inner circumferential surface of the external cylindrical shell 5. A pressure fluid passageway 11 including a check valve 10 is formed in piston 9; also, a pressure control passageway 12 having a pressure control valve 13 is additionally formed in the piston. A shaft seal part 15 such as a mechanical seal is provided just behind the impeller 3 on the revolving shaft 1 in a bore 14 provided in the rear wall of the pump casing 2. A space defined by the shaft seal part 15, the front surface of said piston 9, and the inner surface of the external cylindrical shell 5 comprises a high pressure fluid chamber 16. A compression spring 17 is positioned between the front surface of the bearing box 4 and the rear surface of the piston 9 and a space defined by the front surface of the bearing box 4, the rear surface of the piston 9 and the inner surface of the external cylindrical shell 5 comprises a low pressure chamber 18. A spring plate and oil seal case 19 is mounted on the front surface of the bearing box 4 and retains an oil seal 20 in position. A spring guide 21 is formed on the low pressure side of piston 9 which also supports an oil seal 22. Further, an 0-ring 23 is provided at the outer circumferential surface of the piston 9 for providing a sliding seal with the inner surface of cylindrical shell 5.

The fluid containing part 6 inside the external cylindrical shell 5 is always filled up with fluid such as oil that lubricates the revolving contact faces of the mechanical seal and prevents leakage while also serving to cool the assembly.

Figure 2:
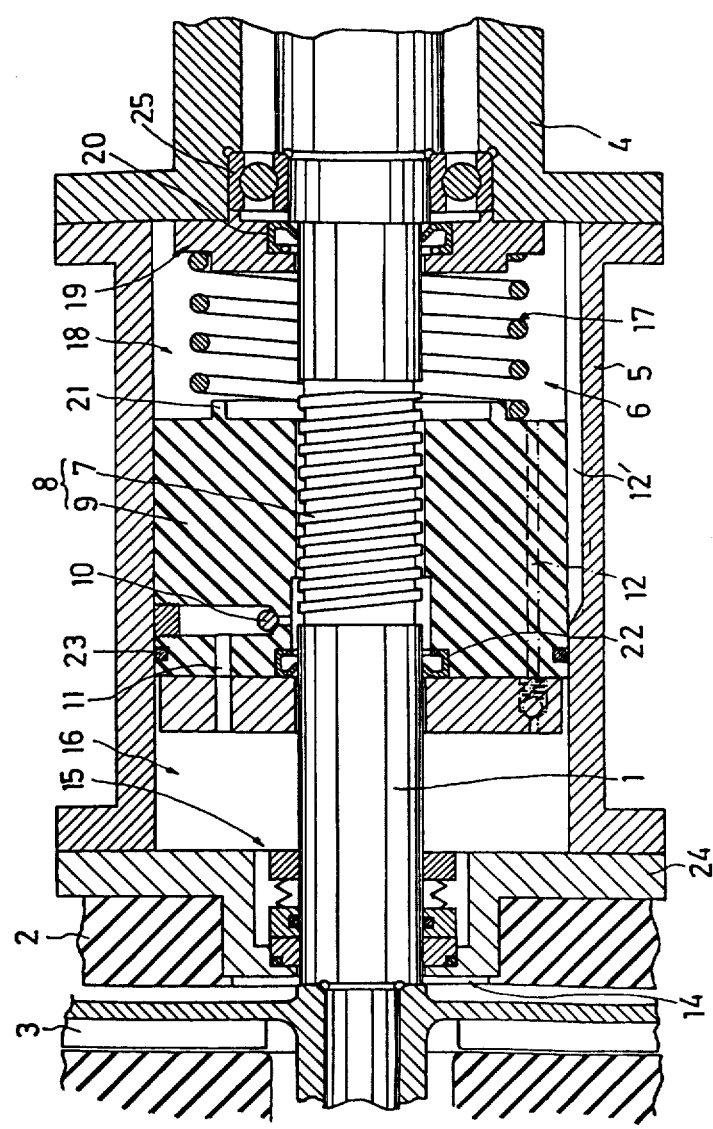
FIG. 2 is a sectional view showing another similar embodiment of the invention.

FIG. 2 illustrates a second embodiment in which the shaft seal part 15 is supported in a holding disk 24 positioned between the pump casing 2 and the external cylindrical shell 5. Also, a pressure control passageway 12' is formed in the inner surface of the external cylindrical shell 5, and the pressure control valve 13 shown in FIG. 1 becomes unnecessary since the compression spring 17 provided in the low pressure chamber 18 serves the same function as the pressure control valve 13. In other words, movement of piston 9 to the right toward the low pressure chamber against the bias of spring 17 eventually causes passageway 12' to momentarily vent the high pressure chamber 16 into the low pressure chamber.

It should also be noted that the provision of a bearing 25 at the portion just behind the shaft seal part 15, namely, in the high pressure fluid chamber 16, enables the external cylindrical shell 5 to serve also both as the shell 5 itself and the bearing box 4, so that it is possible to make the length of the revolving shaft 1 itself shorter and as a result of which, the device can be made the more compactly and precisely. Further, it may also be desired to raise the cooling effect by enlarging the inner diameter of the external cylindrical shell 5 to enable transfer of the high pressure fluid toward the low pressure fluid chamber 18 across the external circumferential surface of the piston 9 as well as to effect the constant circulation of the fluid, and it may further be considered desirable to connect the high pressure fluid chamber 16 to the low pressure fluid chamber 18 by an external pipe through an external control valve.

In employing the device of the invention having the construction details mentioned above, the following detailed explanation will be made with reference to the embodiment shown in FIG. 1, since there exists almost no difference in operation between the embodiments shown in FIGS. 1 and 2. During operation of the pump, the liquid in the low pressure fluid chamber 18 is forced by the threads of pump 7 against check valve 10 to cause the check valve to open. The liquid consequently enters into the high pressure fluid chamber 16 passing through the pressure fluid passageway 11 and the pressure in chamber 16 is elevated. Piston 9 consequently moves toward the bearing box 4 while continuously compressing the compression spring 17. The shaft seal part 15 is surrounded with the high pressure fluid so that the fluid in the pump casing 2 is prevented from leaking into chamber 16. When the pressure in the high-pressure fluid chamber 16 exceeds a predetermined value, control valve 13 opens causing the transfer of fluid from the high pressure chamber 16 via control passageway 12 to the low-pressure fluid chamber 18 so as to achieve a stabilized control condition in which spring 17 is compressed. When the revolving shaft 1 is at rest, the piston 9 is pushed by the compressive force of the compression spring 17 which had been compressed during the preceeding operation of the device, while the check valve 10 and the control valve 13 are closed respectively, thereby the pressure in the high-pressure fluid chamber 16 is maintained to retain effective sealing pressure on seal 15.

When the machine and apparatus are in operation, the high pressure fluid is continuously transferred between the chambers 16 and 18 as a consequence of the rotation of shaft 1 whereby leakage of liquid from the shaft seal part is prevented and the fluid lubrication and cooling are carried out. On the other hand, when the machine and apparatus are out of operation, the high pressure fluid is applied to the shaft seal part with the aid of the piston by the force of the compression spring 17. Moreover, the extremely simple construction of the device makes it easy to manufacture as well as rendering it easy to assemble.

The device of the present invention is very effective for the prevention of the industrial pollution and the like by preventing leakage of liquid in the pump casing and prolonging the life of the revolving contact faces of the shaft seal part.

While there have been described and illustrated preferred embodiments of the present invention, it should be understood that the invention is not limited to the previously discussed embodiments since numerous modifications, alterations, omissions, and additions may be undoubtedly made to those of skill in the art without departing from the spirit and scope of the present invention.

I claim:

1. A shaft sealing pressurizing device positioned adjacent a casing through which a rotary shaft extends through a mechanical shaft seal mounted in an opening in the casing for applying and maintaining pressurized liquid externally of the mechanical shaft seal and adjacent the casing at a level exceeding the pressures generated internally of the casing, said pressurizing device comprising:
   a cylindrical shell concentrically positioned around a portion of said shaft extending externally from said casing and the mechanical shaft seal;
   a piston positioned in said cylindrical shell for reciprocation relative to the shell and said shaft, said piston dividing the interior of said cylindrical shell into a high pressure chamber and a low pressure chamber with the high pressure chamber communicating with the casing and the mechanical shaft seal;
   a body of liquid filling said high pressure chamber and said low pressure chamber;
   pump means driven by said shaft for forcing liquid in the low pressure chamber to the high pressure chamber so as to cause pressure in the high pressure chamber to urge said piston toward the low pressure chamber;
   spring means engageable with said piston for resisting movement of said piston toward said low pressure chamber so that energy is stored in said spring means in response to movement of said piston toward the low pressure chamber whereby said spring means acts to maintain high pressure in said high pressure chamber during periods when said pump is not operating as a result of non-rotation of said shaft.

2. A shaft seal pressurizing device as recited in claim 1 additionally including check valve means between said pump means and said high pressure chamber for preventing reverse fluid flow through said pump means.

3. A shaft seal pressurizing device as recited in claim 2 additionally including pressure control valve means for venting liquid from said high pressure chamber to said low pressure chamber when the pressure in said high pressure chamber reaches a predetermined value.

4. A shaft seal pressurizing device as recited in claim 3 wherein said pump means comprises a screw pump including a pump thread formed on said shaft and cooperating with an axial bore in said piston for forcing liquid through said bore from the low pressure chamber to the high pressure chamber.

5. A shaft seal pressurizing device as recited in claim 4 wherein said check valve and said pressure control valve are located in said piston.

6. A shaft seal pressurizing device as recited in claim 5 wherein said spring means comprises a compression spring mounted in said low pressure chamber.

7. A shaft seal pressurizing device as recited in claim 1 additionally including a pressure control passageway in said cylindrical shell for momentarily venting said high pressure chamber into said low pressure chamber in response to pressure in the high pressure chamber exceeding a predetermined value.

8. A shaft seal pressurizing device as recited in claim 7 additionally including check valve means between said pump means and said high pressure chamber for preventing reverse fluid flow through said pump means.

9. A shaft seal pressurizing device as recited in claim 8 wherein said pump means comprises a screw pump including a pump thread formed on said shaft and cooperating with an axial bore in said piston for forcing liquid through said bore from the low pressure chamber to the high pressure chamber.

10. A shaft seal pressurizing device as recited in claim 9 wherein said spring means comprises a compression spring mounted in said low pressure chamber.

11. A shaft seal pressurizing device as recited in claim 1 wherein said pump means comprises a screw pump including a pump thread formed on said shaft and cooperating with an axial bore in said piston for forcing liquid through said bore from the low pressure chamber to the high pressure chamber.

12. A shaft seal pressurizing device as recited in claim 11 wherein said spring means comprises a compression spring mounted in said low pressure chamber.

* * * * *